United States Patent
Hwang et al.

(10) Patent No.: US 9,858,710 B2
(45) Date of Patent: Jan. 2, 2018

(54) METHOD AND APPARATUS FOR REPRESENTING CORDINATE VALUES OF BOUNDING BOX OF OBJECT

(71) Applicant: Samsung Electronics Co., Ltd., Suwon-si (KR)

(72) Inventors: Seokjoong Hwang, Seoul (KR); Youngsam Shin, Hwaseong-si (KR); Wonjong Lee, Seoul (KR); Jaedon Lee, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 14/589,418

(22) Filed: Jan. 5, 2015

(65) Prior Publication Data

US 2016/0005215 A1    Jan. 7, 2016

(30) Foreign Application Priority Data

Jul. 4, 2014 (KR) .................. 10-2014-0083904

(51) Int. Cl.
*G06T 15/40* (2011.01)
*G06T 15/20* (2011.01)
*G06T 11/40* (2006.01)
*G06T 15/30* (2011.01)
*G06T 15/06* (2011.01)
*G06F 5/01* (2006.01)

(52) U.S. Cl.
CPC ............ *G06T 15/405* (2013.01); *G06F 5/012* (2013.01); *G06T 11/40* (2013.01); *G06T 15/06* (2013.01); *G06T 15/205* (2013.01); *G06T 15/30* (2013.01); *G06T 2210/12* (2013.01)

(58) Field of Classification Search
CPC ..... G06T 15/405; G06T 15/205; G06T 15/30; G06T 15/06; G06T 11/40; G06T 2210/12; G06F 5/012
See application file for complete search history.

(56) References Cited

U.S. PATENT DOCUMENTS

| | | | |
|---|---|---|---|
| 5,748,863 A * | 5/1998 | Fossum | G06T 15/405 345/419 |
| 6,115,047 A * | 9/2000 | Deering | G06T 15/405 345/419 |
| 7,735,061 B2 | 6/2010 | Sweeney | |
| 8,416,861 B2 | 4/2013 | Ugur et al. | |
| 8,508,617 B2 | 8/2013 | Jia et al. | |
| 8,669,977 B2 | 3/2014 | Ernst et al. | |

(Continued)

OTHER PUBLICATIONS

D. Goldberg, "What every computer scientist should know about floating-point arithmetic", Mar. 1991, ACM Computing Surveys, vol. 23 No. 1.*

(Continued)

*Primary Examiner* — Martin Mushambo
(74) *Attorney, Agent, or Firm* — Harness, Dickey & Pierce, P.L.C.

(57) ABSTRACT

Provided are a method and apparatus for representing coordinate values of a bounding box of an object. The apparatus and corresponding method receive a minimum value and a maximum value of coordinate values of a bounding box as floating point values. A difference value is determined between the minimum and maximum values, and the difference value is converted to an exponent and a mantissa.

17 Claims, 14 Drawing Sheets

(56) References Cited

U.S. PATENT DOCUMENTS

| | | | |
|---|---|---|---|
| 2005/0174346 A1* | 8/2005 | Park | G06T 15/04 345/422 |
| 2009/0244058 A1* | 10/2009 | Purcell | G06T 15/06 345/418 |
| 2010/0259493 A1* | 10/2010 | Chang | G06F 3/04883 345/173 |
| 2012/0166510 A1 | 6/2012 | Chen et al. | |

OTHER PUBLICATIONS

Hanika, Johannes, et al. "Towards Hardware Ray Tracing using Fixed Point Arithmetic". Proceedings from the IEEE/EG Symposium on Interactive Ray Tracing, symposium held on Sep. 10-12, 2007, Ulm, Germany, (10 pages, in English).

\* cited by examiner

METHOD AND APPARATUS FOR REPRESENTING CORDINATE VALUES OF BOUNDING BOX OF OBJECT

CROSS-REFERENCE TO RELATED APPLICATION(S)

This application claims the benefit under 35 U.S.C. §119 (a) of Korean Patent Application No. 10-2014-0083904, filed on Jul. 4, 2014, in the Korean Intellectual Property Office, the disclosure of which is incorporated herein in its entirety by reference.

BACKGROUND

1. Field

The following description relates to a method and apparatus to represent coordinate values of a bounding box of an object while traversing a spatially divided acceleration structure.

2. Description of Related Art

While traversing a spatially divided acceleration structure in ray tracing, a bounding box includes a minimum coordinate value and a maximum coordinate value of a region including an object, with respect to each coordinate axis. In the ray tracing, the bounding box is used for a ray-node intersection test that is a part of a space division-acceleration structure traversal process.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an illustrative configuration, there is provided a method, including receiving a minimum value and a maximum value of coordinate values of a bounding box as floating point values; determining a difference value between the minimum and maximum values; and converting the difference value to an exponent and a mantissa.

The method may also include rounding down the minimum value; and rounding up the difference value, wherein the determining of the difference value comprises obtaining a difference value between the rounded down minimum value and the maximum value.

The method may also include pre-scaling the minimum and maximum values to a pre-set first decimal place; and converting the rounded down minimum value to an integer, wherein the rounding down comprises rounding down the pre-scaled minimum value, and the determining of the difference value comprises obtaining a difference value between the pre-scaled maximum value and the rounded down minimum value.

The method may also include rounding up the received maximum value; and rounding up the difference value, wherein the determining of the difference value comprises obtaining a difference value between the rounded up maximum value and the received maximum value.

The method may also include pre-scaling the received minimum and maximum values to a pre-set first decimal place; and converting the rounded up maximum value to an integer, wherein the rounding up of the received maximum value comprises rounding up the pre-scaled maximum value, and the determining of the difference value comprises obtaining a difference value between the pre-scaled minimum value and the rounded up maximum value.

The converting may include processing the mantissa such that the mantissa is unsaturated while converting the difference value to the exponent and the mantissa.

The converting may include subtracting an integer from the mantissa.

The method may also include post-scaling the difference value to a pre-set second decimal place.

The method may also include determining a difference value between the minimum value and the maximum value by using the mantissa and the exponent.

The method may also include determining the maximum value by adding the determined difference value and the minimum value.

The method may also include determining the minimum value by subtracting the determined difference value from the maximum value.

The determining of the difference value may include subtracting a certain integer from the mantissa, and obtaining the difference value by shifting the added mantissa by the exponent.

In accordance with an illustrative configuration, there is provided an apparatus, including an input unit configured to receive a minimum value and a maximum value of coordinate values of a bounding box, as floating point values; an encoding difference value obtainer configured to determine a difference value between the received maximum value and the received minimum value; and an exponent converter configured to convert the difference value to an exponent and a mantissa.

The apparatus may also include an operator configured to round down the minimum value and round up the difference value, wherein the encoding difference value obtainer determines a difference value between the rounded down minimum value and the maximum value.

The apparatus may also include a pre-scaler configured to pre-scale the minimum and maximum values to a pre-set first decimal place; and an integer converter configured to convert the rounded down minimum value to an integer, wherein the operator rounds down the pre-scaled minimum value, and the encoding difference value obtainer determines a difference value between the pre-scaled maximum value and the rounded down minimum value.

The apparatus may also include a post-scaler configured to post-scale the difference value to a pre-set second decimal place.

The apparatus may include a decoding difference value obtainer configured to determine a difference value between the minimum value and the maximum value by using the mantissa and the exponent.

The apparatus may include a maximum value obtainer configured to determine the maximum value by adding the determined difference value and the minimum value.

The exponent converter may be further configured to process the mantissa such that the mantissa is unsaturated while converting the difference value to the exponent and the mantissa.

In accordance with an illustrative configuration, there is provided a computer program embodied on a non-transitory computer readable medium, the computer program being configured to control a processor to perform the method described above.

Other features and aspects may be apparent from the following detailed description, the drawings, and the claims.

BRIEF DESCRIPTION OF THE DRAWINGS

These and/or other aspects will become apparent and more readily appreciated from the following description of the embodiments, taken in conjunction with the accompanying drawings in which.

Figure 1A:
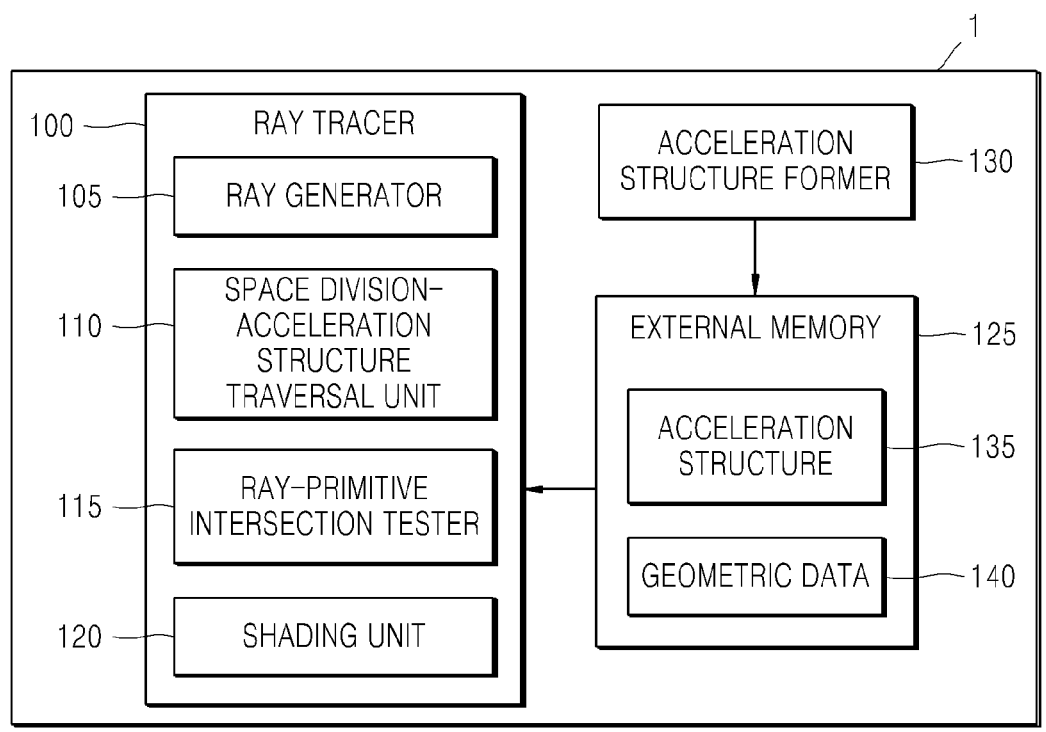
FIGS. 1A through 1F are diagrams describing a ray tracing apparatus and method thereof using a graphic processing unit (GPU) including a ray tracer, according to an embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

The terminology used herein is for the purpose of describing particular embodiments only and is not intended to be limiting of the present invention. As used herein, the singular forms "a," "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "and/or" includes any and all combinations of one or more of the associated listed items. Expressions such as "at least one of", when preceding a list of elements, modify the entire list of elements and do not modify the individual elements of the list.

As described herein below, "3-dimensional (3D) rendering" includes an image process of composing 3D object data to an image viewed from a camera point of view. An example of a rendering method includes a rasterization method in which an image is generated while projecting a 3D object on a screen. Another example of the rendering method includes a ray tracing method in which an image is generated by tracing a path of light incident according to a ray towards each pixel of the image in a camera point of view.

In the specification, a "minimum value" includes a minimum value of coordinate values of a bounding box, and a "maximum value" includes a maximum value of the coordinate values of the bounding box.

FIGS. 1A through 1E are diagrams describing a ray tracing apparatus and method thereof using a graphic processing unit (GPU) 1 including a ray tracer 100. The GPU 1 includes the ray tracer 100, an external memory 125, and an acceleration structure former 130.

The ray tracer 100 includes a ray generator 105, a space division-acceleration structure traversal unit 110, a ray-primitive intersection tester 115, and a shading unit 120. The acceleration structure former 130 forms an acceleration structure 135 and the external memory 125 stores the acceleration structure 135 and geometric data 140. The acceleration structure 135 stored in the external memory 125 includes a structure generated in a 3D space in a hierarchical tree form. For example, the acceleration structure 135 includes a K-dimensional (KD)-tree structure, a bounding volume hierarchy (BVH) structure, or a grid structure. The KD-tree structure is a tree structure in which a space is divided by using points in KD space via a multidimensional search tree. The BVH structure is a tree structure of a group of geometric objects. In the BVH structure, all geometric objects are surrounded by bounding volumes forming leaf nodes of a tree. The grid structure is a structure represented via straight lines intersecting a 2D space. The geometric data 140 stored in the external memory 125 includes data representing a 2D space object. For example, the geometric data 140 may include characteristics of a triangle, an equation representing a triangle, and characteristics of coordinates of a triangle.

Figure 1B:
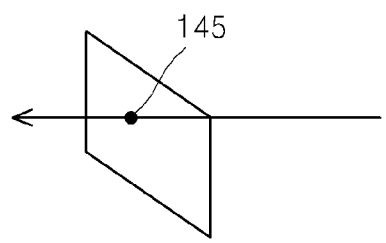
Figure 1C:
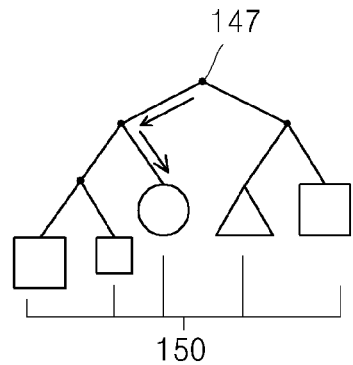

The ray generator 105 changes a virtual ray corresponding to each pixel of a screen to a 3D space based on camera information. In FIG. 1B, the ray generator 105 changes a virtual ray to a 3D space at one pixel 145 from among pixels of a screen. The space division-acceleration structure traversal unit 110 traces a path of a ray in the acceleration structure 135 stored in the external memory 125. The space division-acceleration structure traversal unit 110 finds a leaf node that is first visited by a ray by hierarchically traversing from a root node to lower nodes of an acceleration structure tree. In one example, the root node is an uppermost node and the leaf node is a lowermost node. In FIG. 1C, the space division-acceleration structure traversal unit 110 traverses from a root node 147 to leaf nodes 150. The space division-acceleration structure traversal unit 110 tests whether a ray intersected a node via a ray-node intersection test using a bounding box. The bounding box has a minimum coordinate value and a maximum coordinate value of a region including an object with respect to each coordinate axis. Referring to FIG. 1F, coordinate values of a bounding box generated with respect to one object 165 include a minimum coordinate value 170 and a maximum coordinate value 175 with respect to an x-axis, and the minimum coordinate value 170 and a maximum coordinate value 180 with respect to a y-axis. If an object is a 3D object, coordinate values of a bounding box of the object further include a minimum coordinate value and a maximum coordinate value with respect to a z-axis. In response to coordinate values of a bounding box being encoded in floating point values, the GPU 1 includes a floating point calculator that has a relatively large area compared to other calculators. The floating point calculator is used during a ray-node intersection test that is a part of a space division-acceleration structure traversal process. If coordinate values of a bounding box are encoded in integers, the GPU 1 includes an integer calculator that has a relatively small area compared to a floating point calculator. The ray-primitive intersection tester 115 examines visibility of an object adjacent to a ray.

Figure 1D:
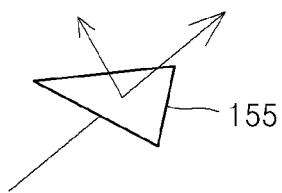
Figure 1E:
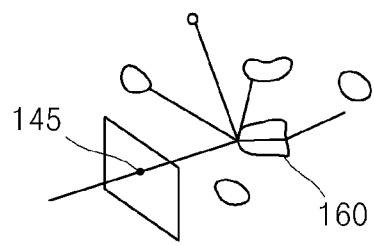
Figure 1F:
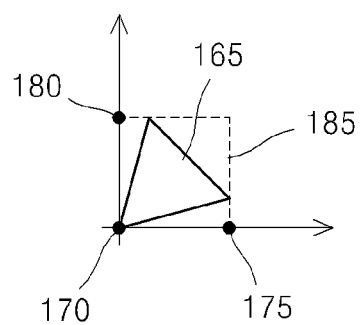

In FIG. 1D, the ray-primitive intersection tester 115 performs a ray intersection test on a primitive in a leaf node with respect to an object 155 adjacent to a ray. A primitive is a simplest geometric object processable by computer graphics. If a primitive intersecting a ray is not found in the leaf node, the ray-primitive intersection tester 115 continuously traverses a tree to search for the primitive intersecting the ray. The ray-primitive intersection tester 115 searches for the primitive by using the geometric data 140 stored in the external memory 125. The shading unit 120 calculates a visible color of a surface of an object. Shading includes shading a surface of a model input to a computer by calculating a distance and angle from a light source, a color, a contrast, etc. of each surface of the model to give the model a 3D effect. In FIG. 1E, the shading unit 120 shades a surface of an object 160 intersecting a ray generated at the pixel 145 on a screen by calculating a distance and an angle from a light source.

Figure 2:
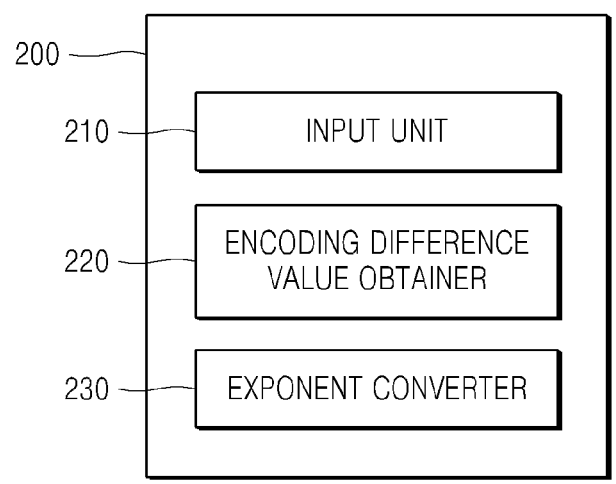
FIG. 2 is a block diagram of an apparatus representing coordinate values of a bounding box of an object, which is included in a space division-acceleration structure traversal unit of FIG. 1A, according to an embodiment.

FIG. 2 is a block diagram of an apparatus 200 representing coordinate values of a bounding box of an object, which is included in the space division-acceleration structure traversal unit 110 of FIG. 1A, according to an embodiment. The apparatus 200 includes an input unit 210, an encoding difference value obtainer 220, and an exponent converter 230. Each of the input unit 210, the encoding difference value obtainer 220, and the exponent converter 230 is a hardware processor or controller.

The input unit 210 receives a minimum value and a maximum value of coordinate values of a bounding box, as floating point values. For example, the input unit 210 receives 24.5345 as a minimum value of an x-axis and 30.9345 as a maximum value of the x-axis, with respect to the coordinate values of the bounding box. The input unit 210 receives a minimum value and a maximum value of coordinate values of each axis of the bounding box.

The encoding difference value obtainer 220 determines or obtains a difference value between the received maximum and minimum values. For example, if the input unit 210 received 30.9345 as the maximum value and 24.5345 as the minimum value, the encoding difference value obtainer 220 determines 6.4000 as the difference value.

The exponent converter 230 converts the difference value to an exponent and a mantissa. For example, when the difference value is 6.4000 and a base is 2, $6.4=1.6000\times2^2$. As a result, the exponent converter 230 converts the difference value such that the mantissa is 1.6000 and the exponent is 2.

The apparatus 200 produces a representation of the minimum value of the coordinate values of the bounding box as the received floating point value, and the maximum value as the difference value converted by the exponent converter 230. For example, the minimum value is represented as 24.5345, and the exponent converter 230 converts the difference value 6.4000 to the mantissa of 1.6000 and the exponent of 2 so as to express the maximum value. Alternatively, the apparatus 200 produces a representation of the maximum value as the received floating point value, and the minimum value as the difference value converted by the exponent converter 230. For example, the maximum value is represented as 30.9345, and the exponent converter 230 converts the difference value 6.4000 to the mantissa of 1.6000 and the exponent of 2 so as to express the minimum value. Because the difference value is a difference between the minimum value and the maximum value, a minus sign is not required, and; as a result an in accordance with an embodiment, a sign bit is not used.

Figure 3:
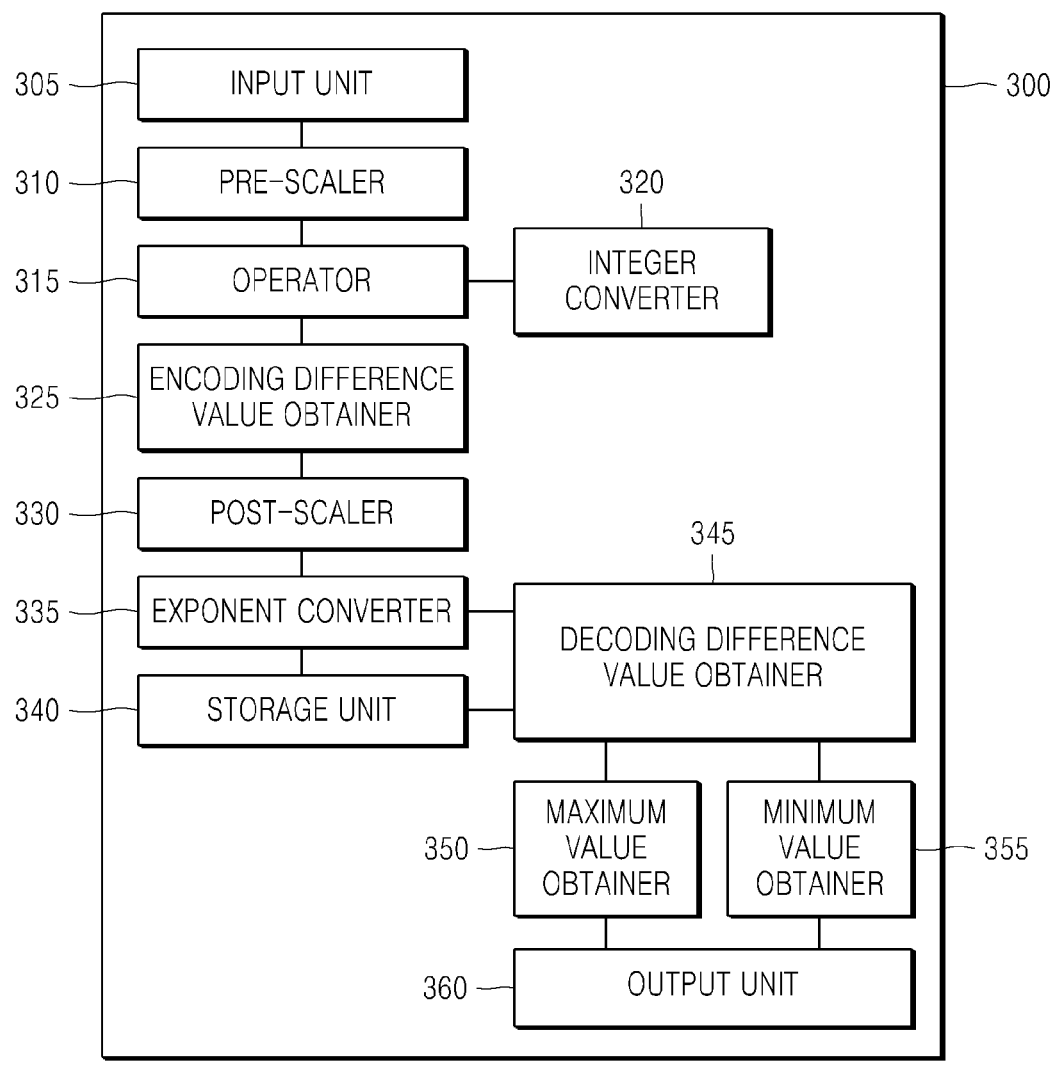
FIG. 3 is a block diagram of an apparatus representing coordinate values of a bounding box of an object, which is included in the space division-acceleration structure traversal unit of FIG. 1A, according to another embodiment.

FIG. 3 is a block diagram of an apparatus 300 representing coordinate values of a bounding box of an object, which is included in the space division-acceleration structure traversal unit 110 of FIG. 1A, according to another embodiment. The apparatus 300 includes an input unit 305, a pre-scaler 310, an operator 315, an integer converter 320, an encoding difference value obtainer 325, a post-scaler 330, an exponent converter 335, a storage unit 450, a decoding difference value obtainer 345, a maximum value obtainer 350, a minimum value obtainer 355, and an output unit 360. Each of the input unit 305, the pre-scaler 310, the operator 315, the integer converter 320, the encoding difference value obtainer 325, the post-scaler 330, the exponent converter 335, the storage unit 450, the decoding difference value obtainer 345, the maximum value obtainer 350, the minimum value obtainer 355, and the output unit 360 is a hardware processor or controller.

The input unit 305 receives a minimum value and a maximum value of coordinate values of a bounding box, as floating point values. For example, the input unit 305 receives 24.5345 as a minimum value of an x-axis with respect to the coordinate values of the bounding box, and 30.9345 as a maximum value of the x-axis. The input unit 210 receives a minimum value and a maximum value with respect to each axis of the bounding box.

The pre-scaler 310 pre-scales the received minimum and maximum values to a pre-set first decimal place. In one illustrative example, a user arbitrarily sets the pre-set first decimal place. For example, if the minimum value is 24.5345 and the maximum value is 30.9345, and the pre-set first decimal place is two decimal places, the pre-scaler 310 pre-scales the minimum value 24.5345 to 24.53 and the maximum value 30.9345 to 30.93.

The operator 315 rounds down the received minimum value or the pre-scaled minimum value, and rounds up a difference value. For example, when the received minimum value is 24.5345 and is set to be rounded down at three decimal places, the operator 315 rounds down the minimum value to 24.53. Also, when the difference value is 6.4000 and is set to be rounded up at three decimal places, the operator 315 rounds up the difference value to 6.40. Alternatively, the operator 315 rounds up the received maximum value or the pre-scaled maximum value, and rounds up the difference value. For example, when the received maximum value is 30.9345 and is set to be rounded up at three decimal places, the operator 315 rounds up the received maximum value to 30.94. Also, when the difference value is 6.4000 and is set to be rounded up at three decimal places, the operator 315 rounds up the difference value to 6.40.

The integer converter 320 converts the rounded down minimum value to an integer, or the rounded up maximum value to an integer. For example, when the rounded down minimum value is 24.53, the integer converter 320 converts the rounded down minimum value to an integer of 2453 by using fixed-point arithmetic. Also, when the rounded up maximum value is 30.94, the integer converter 320 converts the rounded up maximum value to an integer of 3094 by using fixed-point arithmetic.

The encoding difference value obtainer 325 determines or obtains a difference value between the received maximum and minimum values or between the rounded down minimum value and the received maximum value. Alternatively, the encoding difference value obtainer 325 obtains a difference value between the pre-scaled maximum value and the rounded down minimum value or between the rounded up maximum value and the received maximum value. The encoding difference value obtainer 325 determines a difference value between the pre-scaled minimum and maximum values. For example, when the input unit 210 received the maximum value of 30.9345 and the minimum value of 24.5345, the encoding difference value obtainer 220 determines 6.4000 as the difference value.

The post-scaler 330 post-scales the difference value to a pre-set second decimal place. The post-scaling is performed such that the difference value is used up to a certain decimal place. A user may arbitrarily set the pre-set second decimal place. The post-scaler 330 post-scales the difference value to change accuracy of the difference value. For example, when the difference value is 6.4000 and the pre-set second decimal place is three decimal places, the post-scaler 330 post-scales the difference value to 6.400. In response to the pre-scaler 310 pre-scaling the minimum value to two decimal places and the post-scaler 330 post-scaling the difference value to three decimal places, the difference value is represented more accurately than the minimum value. Thus, the pre-scaler 310 and the post-scaler 330 may be separately operated such that accuracy of the minimum value and the difference value, or the maximum value and the difference value are different.

The exponent converter 335 converts the difference value to an exponent and a mantissa. For example, when the difference value is 6.4000 and a base is 2, $6.4=1.6000\times2^2$, the exponent converter 230 converts the difference value such that the mantissa is 1.6000 and the exponent is 2. The exponent converter 335 processes the mantissa to be unsaturated while converting the difference value to the exponent and the mantissa. For example, saturating a mantissa means that, when the mantissa is 1.9999 and an exponent is 2 while rounding up a difference value, an integer part of the mantissa exceeds 1 if the mantissa is rounded up at four decimal places and becomes 2.000. Accordingly, in order to adjust the mantissa to 1, the exponent converter 335 rounds up the exponent to 3 and process the mantissa to 1.000. The exponent converter 335 subtracts a certain integer from the mantissa. The certain integer includes 1. When the exponent converter 335 converts the difference value to the mantissa, the mantissa is represented in a form of 1.xxx. In one example, because a 1 part is a fixed value when the exponent is represented by using a floating point value, the 1 part is removed and added again later for restoration. A storage space is reduced by removing the 1 part. The storage unit 340 stores at least one of the minimum value and the maximum value, and the difference value. The at least one of the minimum and maximum values are a floating point value or an integer.

The storage unit 340 stores at least one of the minimum value, the maximum value, and the difference value. For example, when the apparatus 300 represents the maximum value by the difference value between the minimum and maximum values, the storage unit 340 stores the minimum value and the difference value. When the apparatus 300 represents the minimum value by the difference value between the minimum and maximum values, the storage unit 340 stores the maximum value and the difference value. For example, when the minimum value is 24.53, the storage unit 340 stores 24.53 or 2453 obtained by converting the minimum value to an integer. Also, when the difference value is 6.4000, the storage unit 340 stores 6.400 or stores a mantissa of 1.6000 and an exponent of 2 obtained by converting the difference value. Alternatively, the storage unit 340 stores 0.6000 obtained by excluding 1 from the mantissa of 1.6000 and the exponent of 2, as the difference value.

The decoding difference value obtainer 345 determines the difference value between the minimum and maximum values by using the mantissa and the exponent. The decoding difference value obtainer 345 adds a certain integer to the mantissa, and determines the difference value by shifting the added mantissa by the exponent. For example, the certain integer includes 1 because 1 is added to the mantissa during decoding as a floating point value is represented after removing an integer part of 1. When the exponent converter 335 converts the difference value to the mantissa, 1 is removed from mantissa, and the decoding difference value obtainer 345 adds 1 again to restore an original value of the mantissa. For example, when the minimum value is 24.53 and the difference value has the mantissa of 0.60 and the exponent of 2, the decoding difference value obtainer 345 determines 6.40 as the difference value by shifting 1.60 obtained by adding 1 to the mantissa by the exponent of 2.

The maximum value obtainer 350 obtains, determines, or produces the maximum value by adding the obtained difference value and the minimum value. For example, when the obtained difference value is 6.40 and the minimum value is 24.53, the maximum value obtainer 350 obtains the maximum value of 30.93 by adding the difference value and the minimum value. The maximum value obtainer 350 obtains a minimum value from a pre-set origin value by subtracting the pre-set original value from the minimum value, and then obtains a maximum value from the pre-set origin value by adding the difference value to the minimum value from the pre-set origin value. The pre-set original value is a coordinate value of a certain object in the ray tracer. For example, when the minimum value is 24.53, the pre-set origin value is 2.10, and the difference value is 6.40, the maximum value obtainer 350 obtains the minimum value from the pre-set origin value to be 24.53-2.10=26.63, and obtains the maximum value from the pre-set origin value to be 26.63+6.4=33.03.

The minimum value obtainer 355 obtains the minimum value by subtracting the difference value from the maximum value. The minimum value obtainer 355 obtains the maximum value from the pre-set origin value by subtracting the pre-set original value from the maximum value, and obtains the minimum value from the pre-set origin value by subtracting the difference value from the maximum value from the pre-set origin value. For example, when the maximum value is 30.93, the pre-set origin value is 2.10, and the difference value is 6.40, the minimum value obtainer 355 obtains the maximum value from the pre-set original value to be 30.93−2.10=28.83, and the minimum value from the pre-set origin value to be 38.83−6.40=22.43.

The output unit 360 outputs at least one of the minimum value and the maximum value. For example, the output unit 360 outputs the minimum value of 24.53 or the maximum value of 30.93.

Figure 4A:
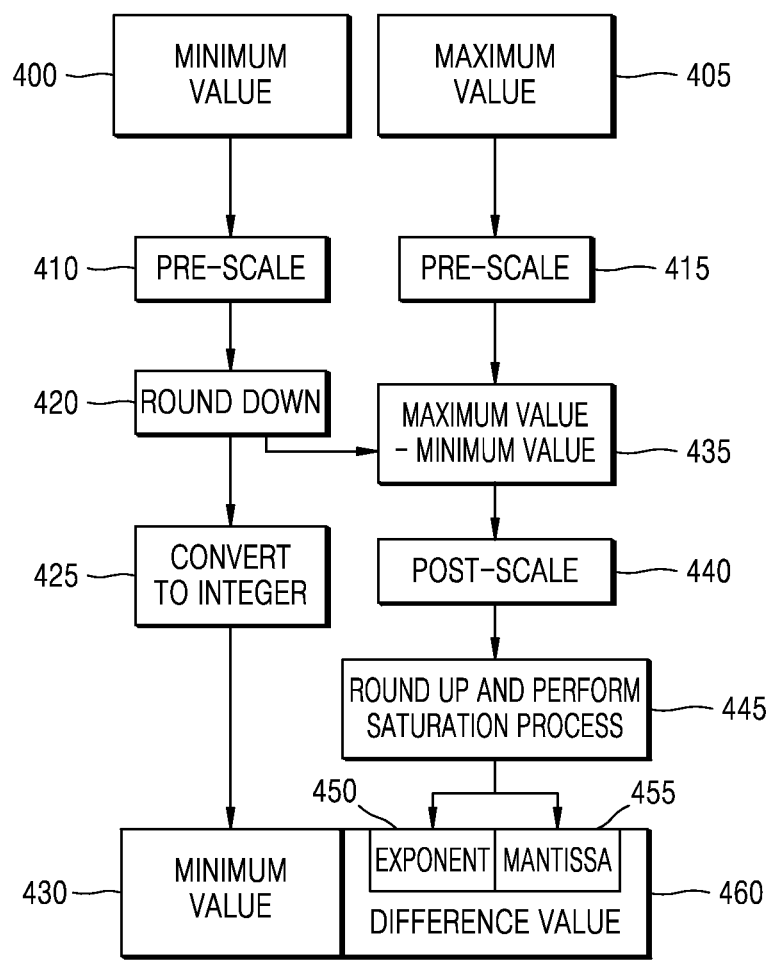
FIGS. 4A and 4B are diagrams describing a method representing coordinate values of a bounding box of an object, according to an embodiment.
Figure 4B:
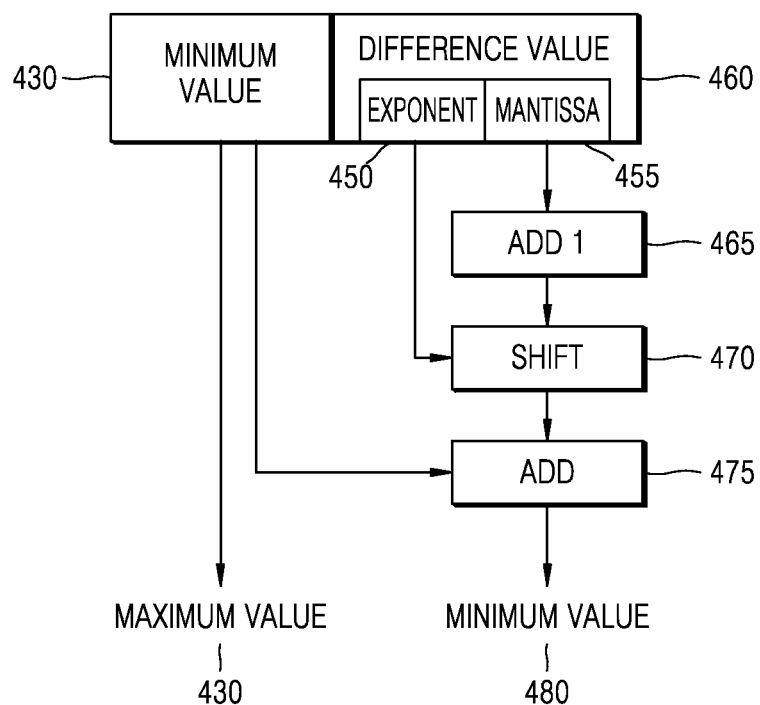

FIGS. 4A and 4B are diagrams for describing a method representing coordinate values of a bounding box of an object, according to an embodiment. A method of encoding a minimum value and a maximum value received with respect to coordinate values of a bounding box to a minimum value and a difference value will now be described with reference to FIG. 4A.

The method receives at the input unit 305 a minimum value 400 and a maximum value 405. The minimum and maximum values 400 and 405 are floating point values. For example, the method receives at the input unit 305 24.5345 as the minimum value 400 and 30.9345 as the maximum value 405.

The method pre-scales at the pre-scaler 310 the minimum value 400 to a pre-set first decimal place, in operation 410. The method pre-scales at the pre-scaler 310 the maximum value 405 to the pre-set first decimal place, in operation 415. Pre-scaling is performed to adjust a minimum value and a maximum value according to accuracy of the minimum value. For example, when a minimum value is 24.5345, a maximum value is 30.9345, and a pre-set first decimal place is two decimal places, the method pre-scales at the pre-scaler 310 the minimum value to 24.53 and the maximum value to 30.93.

The method rounds down at the operator 315 the pre-scaled minimum value 400, in operation 420. A minimum value is rounded down such that the apparatus 300 represents an accurate minimum coordinate value of bounding box and an accurate maximum coordinate value of bounding box. For example, when a pre-scaled minimum value is 24.53 and is set to be rounded down at two decimal places, the method rounds down at the operator 315 the pre-scaled minimum value to 24.5.

The method converts at the integer converter 320 the rounded down minimum value 400 to an integer in operation 425, thereby obtaining a minimum value 430. For example, when a rounded down minimum value is 24.50, the method at the integer converter 320 converts 24.50 to 2450 by using fixed-point arithmetic.

The method at the storage unit 340 stores the minimum value 430. A minimum value is converted to an integer because calculating an integer is simpler than calculating a floating point value and an area of a calculator for an integer is small. For example, the method at the storage unit 340 stores 2450 as a minimum value that is converted to an integer.

The method obtains at the encoding difference value obtainer 325 a difference value between the pre-scaled maximum value 405 and the rounded down minimum value 400, in operation 435. For example, when a pre-scaled maximum value is 30.93 and a rounded down minimum value is 24.50, the method at the encoding difference value obtainer 220 obtains 6.43 as a difference value.

The method post-scales at the post-scaler 330 the difference value to a pre-set second decimal place, in operation 440. For example, when a difference value is 6.43 and a pre-set second decimal place is a one decimal place, the method post-scales at the post-scaler 330 the difference value to 6.4. In one example, post-scaling is performed such that a minimum value and a difference value have different accuracy.

In operation 445, the method rounds up at the operator 315 the post-scaled difference value, and the method at the exponent converter 335 converts the rounded up difference value to obtain a difference value 460 having an exponent 450 and a mantissa 455 and performs a saturation process such that the mantissa 455 is not saturated. The method rounds up a difference value such that the apparatus 300 represents an accurate minimum coordinate value of bounding box and an accurate maximum coordinate value of bounding box. For example, saturating a mantissa means that, when the mantissa is 1.9999 and an exponent is 2 while rounding up a difference value, an integer part of the mantissa exceeds 1 if the mantissa is rounded up at four decimal places and becomes 2.000. Accordingly, in order to adjust the mantissa to 1, the method at the exponent converter 335 rounds up the exponent to 3 and process the mantissa to 1.000. For example, when a difference value is 6.4 and a base is 2, $6.4=1.6\times2^2$, the method converts at the exponent converter 230 the difference value such that a mantissa is 1.6 and an exponent is 2. Alternatively, when the difference value is 6.4, the method at the exponent converter 230 converts the difference value such that the exponent is 2 and the mantissa is 0.6 by subtracting 1 from 1.6.

The method at the storage unit 340 stores the difference value 460 converted to the exponent 450 and the mantissa 455. For example, the method stores at the storage unit 340 a difference value of 6.4. Because the difference value 460 is not a negative value, the method at the storage unit 340 does not store a sign bit in a floating point value. The difference value 460 is a value corresponding to a size of a region including a bounding box. According to a method of representing coordinate values of a bounding box, a bounding box having a large region is represented with low accuracy and a bounding box having a small region is represented with high accuracy, based on characteristics of floating point values.

According to some embodiments, when a ray tracer performs a ray-node test, a lower node of a space division-acceleration structure tree is more precisely represented and accuracy of the ray-node test increases according to progress of a tree traversal process.

A method of decoding a minimum value and a difference value to the minimum value and a maximum value with respect to coordinate values of a bounding box will now be described with reference to FIG. 4B.

The method adds at the decoding difference value obtainer 345 1 to the mantissa 455 of the difference value 460, in operation 465. The method obtains at the decoding difference value obtainer 345 the difference value 460 by shifting the mantissa 455 to which 1 is added by using the exponent 450, in operation 470. For example, when a minimum value is 24.53, and a difference value has a mantissa of 0.6 and an exponent of 2, the method obtains at the decoding difference value obtainer 345 the difference value of 6.4 by adding 1 to the mantissa to obtain 1.6 and then shifting the added mantissa by the exponent of 2.

The method at the maximum value obtainer 350 obtains a maximum value 480 by adding the difference value 460 and the minimum value 430, in operation 475. For example, when a difference value is 6.4 and a minimum value is 24.53, the method obtains at the maximum value obtainer 350 a maximum value of 30.93 by adding the difference value and the minimum value. The method outputs from the output unit 360 at least one of the minimum value 430 and the maximum value 480. For example, the method, from the output unit 360, outputs 24.53 as a minimum value or 30.93 as a maximum value.

The methods of FIGS. 4A and 4B are performed on each of three axes. In FIGS. 4A and 4B, a minimum value is represented in an integer and maximum value is represented in a difference value, wherein a difference between the maximum value and the minimum value is represented as a floating point value.

If an apparatus representing coordinate values of a bounding box represents both a minimum value and a maximum value in integers, a range of a region included in a bounding box increases during rounding down and rounding up, compared to a floating point value. As a result, a false-positive result is output during a ray-node intersection test. A false-positive result is accompanied by additional space division-acceleration structure traversal and ray-primitive intersection. Therefore, performance of a ray tracer deteriorates. If the apparatus represents a difference value in a floating point value and a minimum value in an integer, an area of a calculator obtainable by encoding a bounding box in integers decreases, a memory bandwidth increases, and deterioration of accuracy is reduced.

Figure 5A:
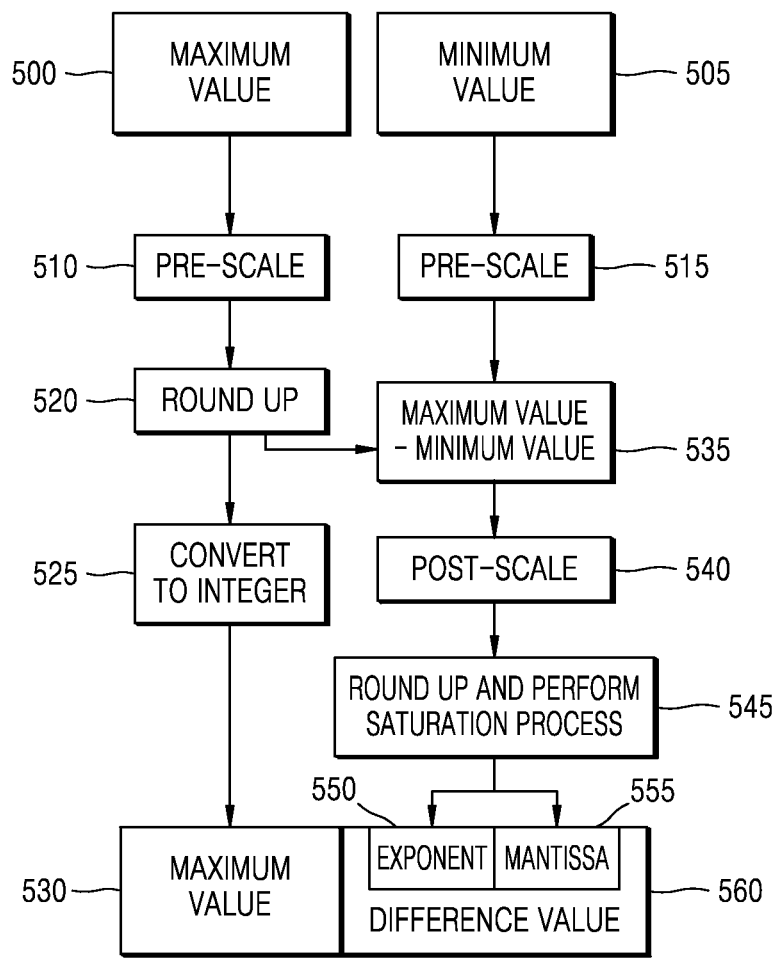
FIGS. 5A and 5B are diagrams describing a method representing coordinate values of a bounding box of an object, according to another embodiment.
Figure 5B:
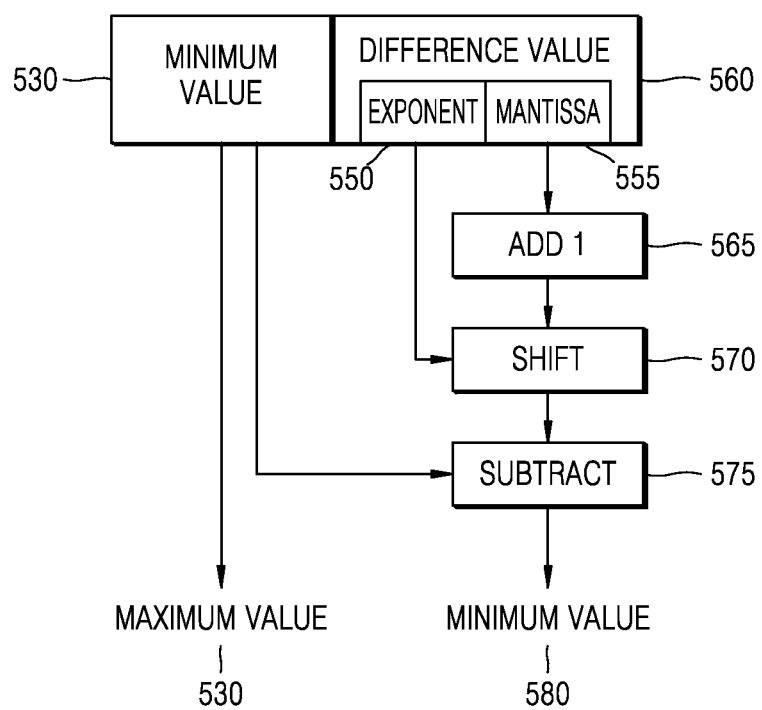

FIGS. 5A and 5B are diagrams for describing a method of representing coordinate values of a bounding box of an object, according to another embodiment. A method of encoding a minimum value and a maximum value received with respect to coordinate values of a bounding box to a maximum value and a difference value will now be described with reference to FIG. 5A.

The input unit 305 receives a maximum value 500 and a minimum value 505. The minimum and maximum values 500 and 505 are floating point values. For example, the input unit 305 receives 24.5345 as the minimum value 500 and 30.9345 as the maximum value 505.

The method pre-scales through the pre-scaler 310 the maximum value 500 to a pre-set first decimal place, in operation 510. The method at the pre-scaler 310 pre-scales the minimum value 505 to the pre-set first decimal place, in operation 515. Pre-scaling is performed to adjust a minimum value and a maximum value according to accuracy of the maximum value. For example, when a minimum value is 24.5345, a maximum value is 30.9345, and a pre-set first decimal place is two decimal places, the method pre-scales at the pre-scaler 310 the minimum value to 24.53 and the maximum value to 30.93.

The method rounds up at the operator 315 the pre-scaled maximum value 500, in operation 520. A maximum value is rounded up such the apparatus 300 and corresponding method represent an accurate minimum coordinate value of bounding box and an accurate maximum coordinate value of bounding box. For example, when a pre-scaled maximum value is 30.93 and is set to be rounded up at two decimal places, the method rounds up at the operator 315 the pre-scaled maximum value to 31.00.

The method converts at the integer converter 320 the rounded up maximum value 500 to an integer in operation 525, thereby obtaining a maximum value 530. For example, when a rounded up maximum value is 31.00, the method at the integer converter 320 converts 31.00 to 3100 by using fixed-point arithmetic.

The method stores at the storage unit 340 the minimum value 530. A maximum value is converted to an integer because calculating an integer is simpler than calculating a floating point value and an area of a calculator for an integer is small. For example, the method stores 3100 at the storage unit 340 as a maximum value that is converted to an integer.

The method obtains at the encoding difference value obtainer 325 a difference value between the pre-scaled minimum value 505 and the rounded up maximum value 500, in operation 535. For example, when a pre-scaled minimum value is 24.53 and a rounded up maximum value is 31.00, the method obtains 6.47 at the encoding difference value obtainer 220 as a difference value.

The method post-scales at the post-scaler 330 the difference value to a pre-set second decimal place, in operation 540. For example, when a difference value is 6.47 and a pre-set second decimal place is a one decimal place, the method post-scales at the post-scaler 330 the difference value to 6.4. In one illustrative example, post-scaling is performed such that a maximum value and a difference value have different accuracy.

In operation 545, the method rounds up at the operator 315 the post-scaled difference value. The method converts at the exponent converter 335 the rounded up difference value to obtain a difference value 560 having an exponent 550 and a mantissa 555, and performs a saturation process such that the mantissa 555 is not saturated. A difference value is rounded up such that the apparatus 300 and corresponding method represent an accurate minimum coordinate value of bounding box and an accurate maximum coordinate value of bounding box. For example, saturating a mantissa means that, when the mantissa is 1.9999 and an exponent is 2 while rounding up a difference value, an integer part of the mantissa exceeds 1 if the mantissa is rounded up at four decimal places and becomes 2.000. Accordingly, in order to adjust the mantissa to 1, the exponent converter 335 may round up the exponent to 3 and process the mantissa to 1.000. For example, when a difference value is 6.4 and a base is 2, $6.4=1.6\times2^2$, the method converts at the exponent converter 230 the difference value such that a mantissa is 1.6 and an exponent is 2. Alternatively, when the difference value is 6.4, the method converts at the exponent converter 230 the difference value such that the exponent is 2 and the mantissa is 0.6 by subtracting 1 from 1.6.

The method at the storage unit 340 stores the difference value 560 converted to the exponent 550 and the mantissa 555. For example, the method stores at the storage unit 340 a difference value of 6.4. Because the difference value 560 is not a negative value, the method does not store at the storage unit 340 a sign bit in a floating point value. The difference value 560 is a value corresponding to a size of a region including a bounding box. According to a method of representing coordinate values of a bounding box, based on characteristics of floating point values, a bounding box having a large region is represented in low accuracy and a bounding box having a small region is represented in high accuracy.

According to some embodiments, when a ray tracer performs a ray-node test, a lower node of a space division-acceleration structure tree is more precisely represented and accuracy of the ray-node test increases according to progress of a tree traversal process.

A method of decoding a maximum value and a difference value to a minimum value and the maximum value with respect to coordinate values of a bounding box will now be described with reference to FIG. 5B.

The method adds 1 at the decoding difference value obtainer 345 to the mantissa 555 of the difference value 560, in operation 565. The method at the decoding difference value obtainer 345 obtains the difference value 560 by shifting the mantissa 555 to which 1 is added by using the exponent 550, in operation 570. For example, when a difference value has a mantissa of 0.6 and an exponent of 2, the method at the decoding difference value obtainer 345 obtains the difference value of 6.4 by adding 1 to the mantissa to obtain 1.6 and then shifting the added mantissa by the exponent of 2.

The method obtains at the maximum value obtainer 350 a minimum value 580 by subtracting the difference value 560 from the maximum value 530, in operation 475. For example, when a difference value is 6.4 and a maximum value is 31.00, the method obtains at the minimum value obtainer 355 a minimum value of 24.6 by subtracting the difference value from the maximum value. The method outputs from the output unit 360 at least one of the maximum value 530 and the minimum value 580. For example, the method outputs from the output unit 360 24.6 as a minimum value or 31.00 as a maximum value.

Figure 6:
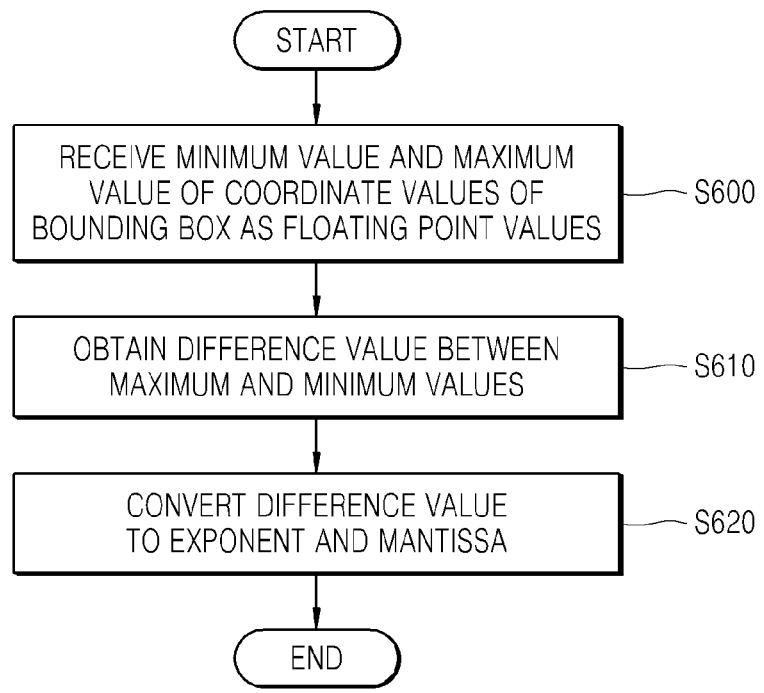
FIG. 6 is a flowchart of a method representing coordinate values of a bounding box of an object, according to an embodiment.

FIG. 6 is a flowchart of a method representing coordinate values of a bounding box of an object, according to an embodiment.

In operation S600, the method receives at the input unit 210 a minimum value and a maximum value of coordinate values of a bounding box as floating point values. In operation S610, the method obtains at the encoding difference value obtainer 220 a difference value between the maximum and minimum values. In operation S620, the method converts at the exponent converter 230 the difference value to an exponent and a mantissa.

Figure 7:
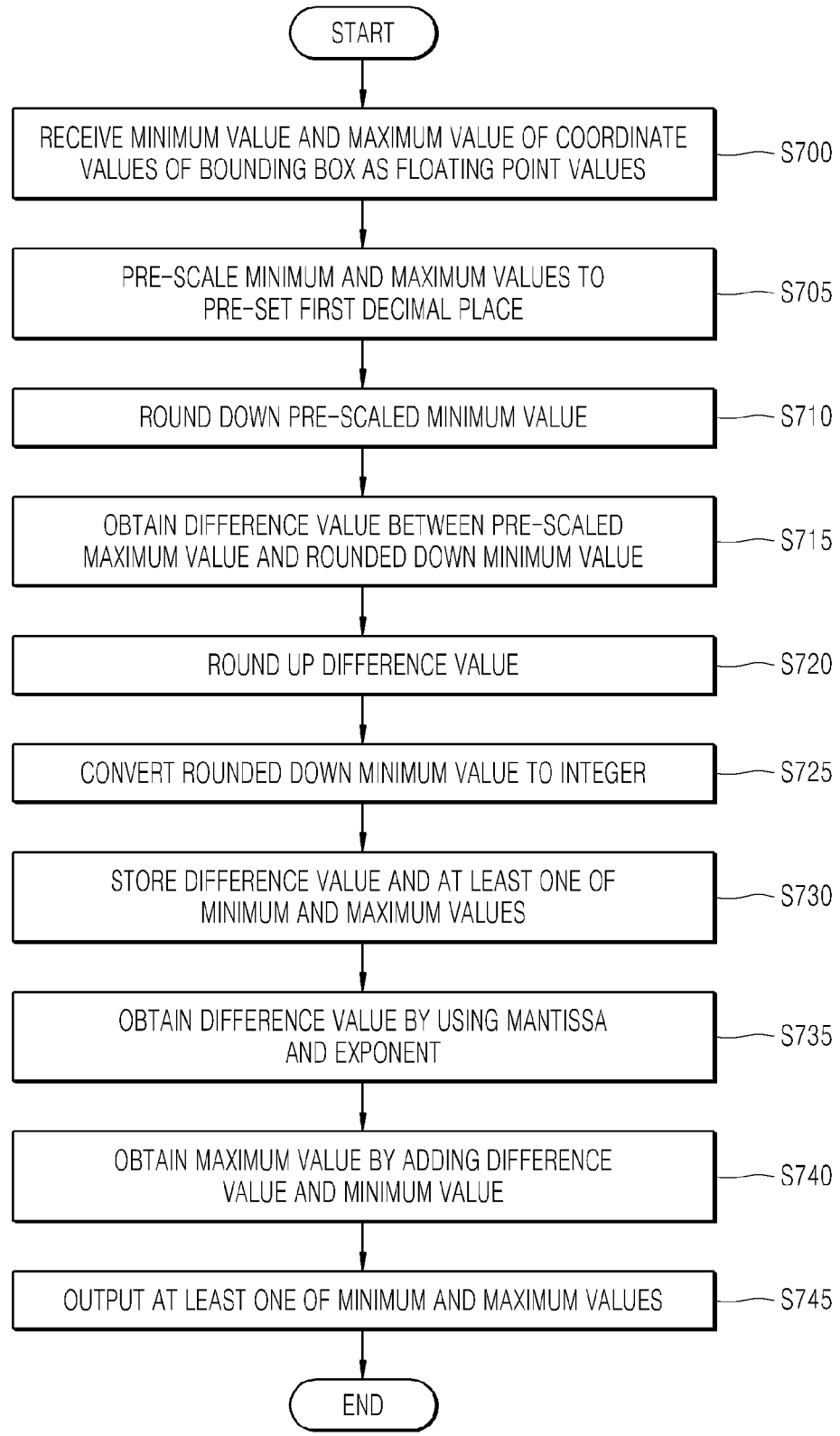
FIG. 7 is a flowchart of a method representing coordinate values of a bounding box of an object, according to another embodiment.

FIG. 7 is a flowchart of a method representing coordinate values of a bounding box of an object, according to another embodiment.

In operation S700, the method receives at the input unit 305 a minimum value and a maximum value of coordinate values of a bounding box as floating point values. In operation S705, the method at the pre-scaler 310 pre-scales the minimum and maximum values to a pre-set first decimal place. The pre-set first decimal place is arbitrarily set by a user. In operation S710, the method rounds down at the operator 315 the pre-scaled minimum value. In operation S715, the method obtains at the encoding difference value obtainer 325 a difference value between the pre-scaled maximum value and the rounded down minimum value. In operation S720, the method at the post-scaler 330 rounds up the difference value.

In operation S725, the method converts at the exponent converter 335 the rounded down minimum value to an integer. In operation S730, the method stores at the storage unit 340 at least one of the minimum value and the maximum value, and the difference value. In operation S735, the method obtains at the decoding difference value obtainer 345 the difference value by using a mantissa and an exponent. In operation S740, the method obtains at the maximum value obtainer 350 the maximum value by adding the difference value and the minimum value. In operation S745, the method outputs from the output unit 360 at least one of the minimum value and the maximum value.

Figure 8:
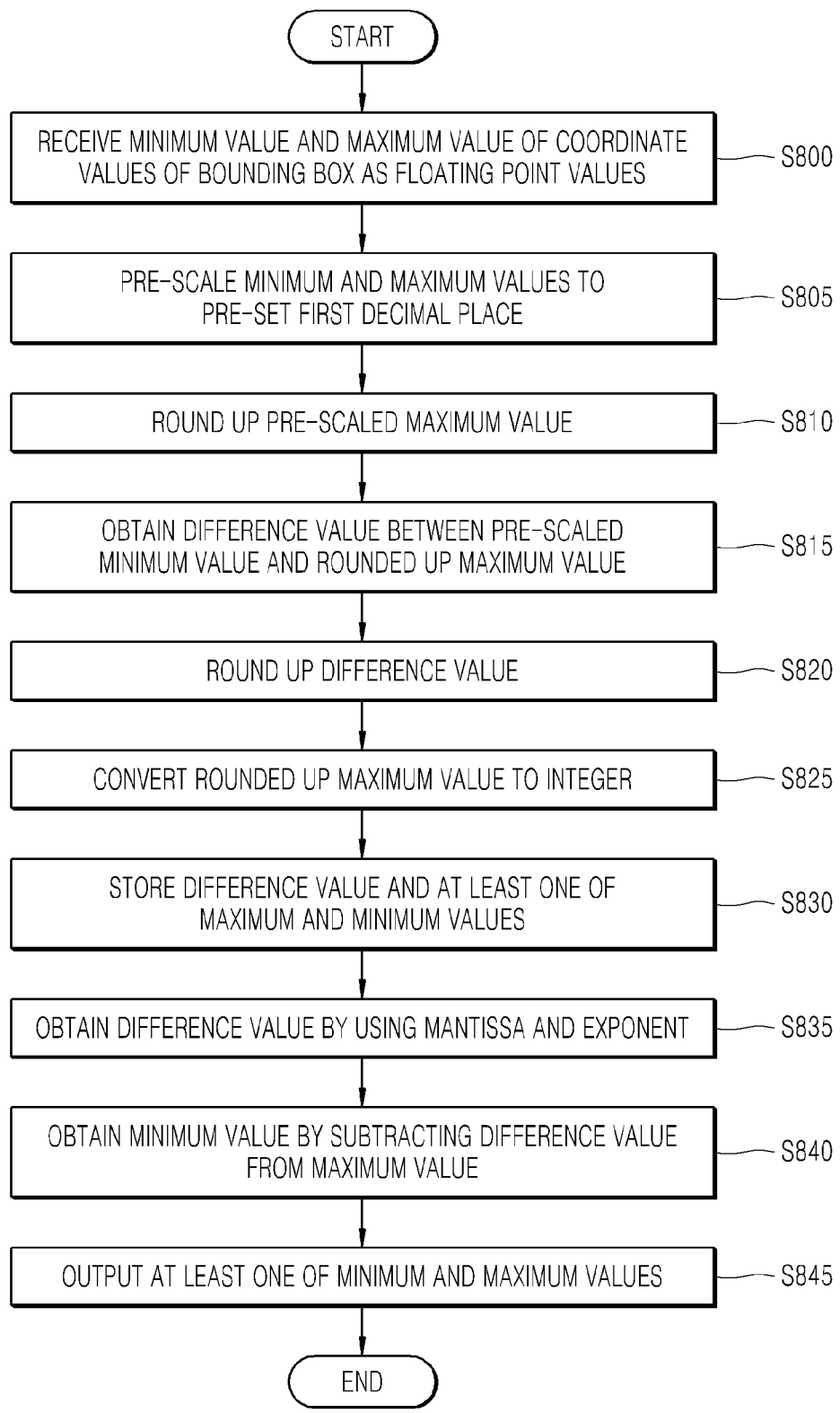
FIG. 8 is a flowchart of a method representing coordinate values of a bounding box of an object, according to yet another embodiment.

FIG. 8 is a flowchart of a method representing coordinate values of a bounding box of an object, according to another embodiment.

In operation S800, the method receives at the input unit 305 a minimum value and a maximum value of coordinate values of a bounding box as floating point values. In operation S805, the method at the pre-scaler 310 pre-scales the minimum and maximum values to a pre-set first decimal place. In operation S810, the method rounds up at the operator 315 the pre-scaled maximum value. In operation S815, the method obtains at the encoding difference value obtainer 325 a difference value between the pre-scaled minimum value and the rounded up maximum value. In operation S820, the method rounds up at the post-scaler 330 the difference value. In operation S825, the method at the exponent converter 335 converts the rounded up maximum value to an integer.

In operation S830, the method at the storage unit 340 stores the difference value and at least one of the minimum and maximum values. In operation S835, the method obtains at the decoding difference value obtainer 345 the difference value by using a mantissa and an exponent. In operation S840, the method at the minimum value obtainer 355 obtains the minimum value by subtracting the difference value from the maximum value. In operation S845, the method outputs from the output unit 360 at least one of the minimum and maximum values.

Figure 9A:
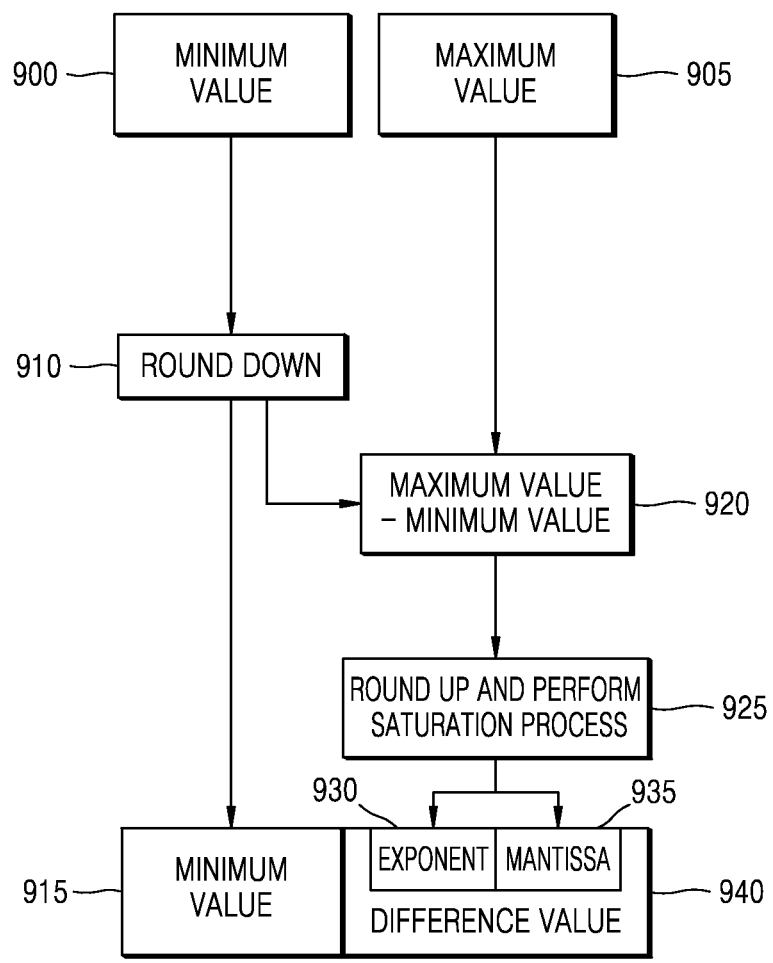
FIGS. 9A and 9B are diagrams describing a method of representing coordinate values of a bounding box of an object, according to another embodiment.
Figure 9B:
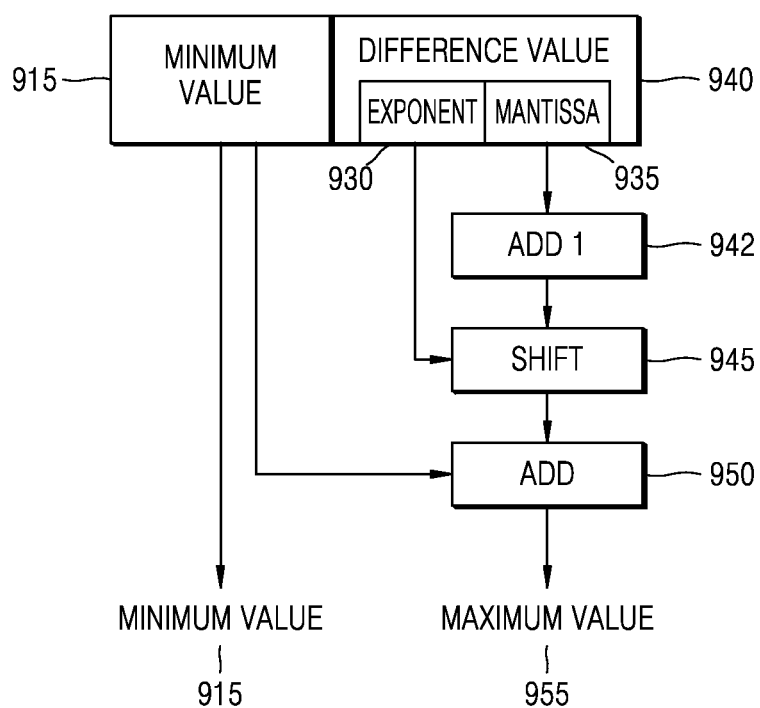

FIGS. 9A and 9B are diagrams describing a method representing coordinate values of a bounding box of an object, according to another embodiment.

A method of encoding a minimum value and a maximum value received with respect to coordinate values of a bounding box to the minimum value and a difference value will now be described with reference to FIG. 9A. The method receives at the input unit 305 a minimum value 900 and a maximum value 905. The minimum value 900 and the maximum value 905 are floating point values. In operation 910, the method rounds down at the operator 315 the minimum value 900 to obtain a minimum value 915. A minimum value is rounded down such that the apparatus 300 produces an accurate minimum coordinate value of bounding box and an accurate maximum coordinate value of bounding box. The method stores at the storage unit 340 the minimum value 915. The method obtains through the encoding difference value obtainer 325 a difference value between the maximum value 905 and the rounded down minimum value 900, in operation 920. In operation 925, the method at the operator 315 rounds up the difference value, and converts through the exponent converter 335 the rounded up difference value to obtain a difference value 940 having an exponent 930 and a mantissa 935 and performs a saturation process such that the mantissa 935 is not saturated. A difference value is rounded up such that the apparatus 300 and method thereof represents an accurate minimum coordinate value of bounding box and an accurate maximum coordinate value of bounding box. The method stores at the storage unit 340 the difference value 940 between the maximum value and the minimum value, which have been converted into the exponent 930 and the mantissa 935.

A method of decoding a minimum value and a difference value to the minimum value and a maximum value with respect to coordinate values of a bounding box will now be described with reference to FIG. 9B. The method at the decoding difference value obtainer 345 adds 1 to the mantissa 935 of the difference value 940, in operation 942. The method obtains at the decoding difference value obtainer 345 the difference value 940 by shifting the mantissa 935 to which 1 is added by using the exponent 930, in operation 945. The method obtains at the maximum value obtainer 350 a maximum value 955 by adding the difference value 940 and the minimum value 915, in operation 950. The method outputs through the output unit 360 at least one of the minimum value 915 and the maximum value 955.

Figure 10:
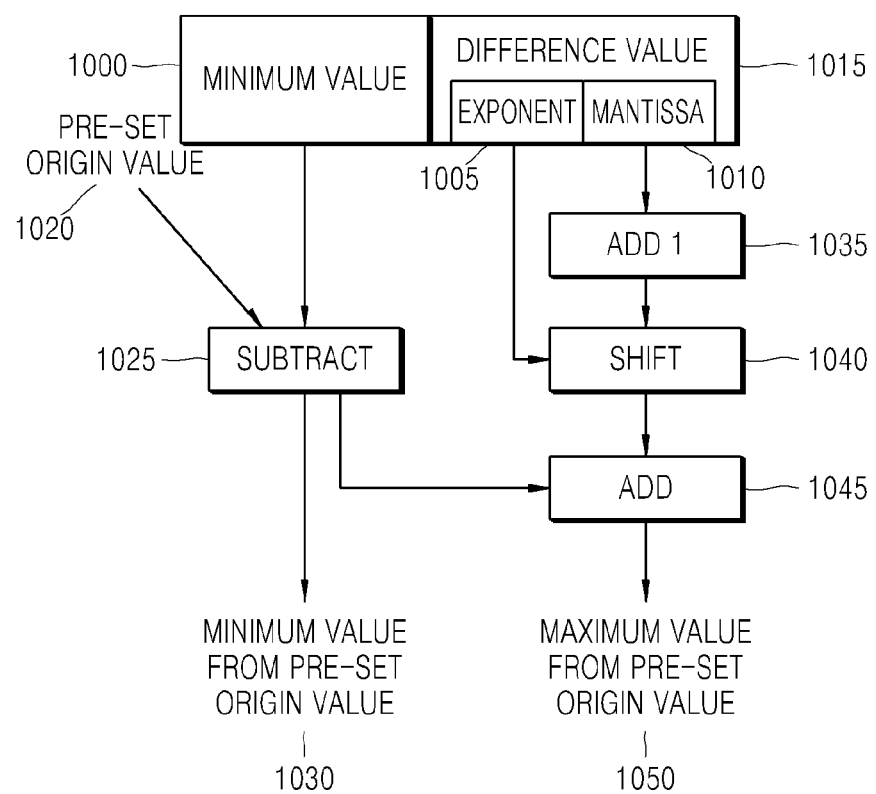
FIG. 10 is a diagram for describing a method representing coordinate values of a bounding box of an object, which is performed by a ray tracer, according to an embodiment.

FIG. 10 is a diagram for describing a method of representing coordinate values of a bounding box of an object, which is performed by a ray tracer, according to an embodiment. A method of decoding a minimum value and a difference value of a bounding box to the minimum value and a maximum value while a ray tracer performs a ray-node test will now be described with reference to FIG. 10. The method at the decoding difference value obtainer 345 adds 1 to a mantissa 1010 of a difference value 1015, in operation 1035. The method obtains at the decoding difference value obtainer 345 the difference value 1015 by shifting the mantissa 1010 to which 1 is added by using an exponent 1005, in operation 1040. The method at the maximum value obtainer 350 obtains a minimum value 1030 from a pre-set origin value 1020 of a ray by subtracting the pre-set origin value 1020 from a minimum value 1000, in operation 1025. The method obtains at the maximum value obtainer 350 a maximum value 1050 from the pre-set origin value 1020 by adding the minimum value 1030 and the difference value 1015 in operation 1045. The method at the output unit 360 outputs at least one of the minimum value 1030 and the maximum value 1050. If the method at the maximum value obtainer 350 obtains a maximum value and then subtracts a pre-set origin value of ray from the maximum value, two subtractions are performed on a minimum value and the maximum value. However, if the maximum value obtainer 350 subtracts a pre-set origin value of a ray from a minimum value, and then obtains a maximum value by adding a difference value and the subtracted minimum value, the method performs only one subtraction.

As described above, according to the one or more of the above embodiments, a method of representing coordinate values of a bounding box may require a calculator having a small area, and may prevent deterioration of accuracy.

It is to be understood that in the embodiment, the operations in FIGS. 3-10 are performed in the sequence and manner as shown although the order of some operations and the like may be changed without departing from the spirit and scope of the described configurations. In accordance with an illustrative example, a computer program embodied on a non-transitory computer-readable medium may also be provided, encoding instructions to perform at least the methods described in FIGS. 3-10.

Program instructions to perform methods described in FIGS. 3-10, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein may be easily construed by programmers skilled in the art to which the embodiments pertain based on and using the flow diagrams and block diagrams of the figures and their corresponding descriptions as provided herein.

The units and apparatuses described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a hardware component may include multiple processors or a processor and a controller. In addition, different processing configurations are possible, such a parallel processors.

The particular implementations shown and described herein are illustrative examples of the invention and are not intended to otherwise limit the scope of the embodiments in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of representing coordinate values of a bounding box by a device including at least one processor, the method comprising:
receiving, by the at least one processor, a minimum value and a maximum value of coordinate values of the bounding box as floating point values;
converting, by the at least one processor, the minimum value and the maximum value to fixed point values;
determining, by the at least one processor, a difference value between the minimum and maximum values;
converting, by the at least one processor, the difference value to an exponent and a mantissa,
performing, by the at least one processor, a ray-node intersection test using the fixed point value of either the maximum value or the minimum value, and the difference value;
generating, by the at least one processor, an image by performing ray tracing based on a result of the ray-node intersection test;
rounding down, by the at least one processor, the minimum value;
rounding up, by the at least one processor, the difference value, wherein the determining of the difference value by the at least one processor comprises obtaining a difference value between the rounded down minimum value and the maximum value;

pre-scaling, by the at least one processor, the minimum and maximum values to a pre-set first decimal place; and converting, by the at least one processor, the rounded down minimum value to an integer, wherein the rounding down by the processor comprises rounding down the pre-scaled minimum value, and the determining of the difference value by the at least one processor comprises obtaining a difference value between the pre-scaled maximum value and the rounded down minimum value.

2. The method of claim 1, further comprising:

rounding up, by the at least one processor, the received maximum value; and rounding up, by the at least one processor, the difference value, wherein the determining of the difference value by the at least one processor comprises obtaining a difference value between the rounded up maximum value and the received maximum value.

3. The method of claim 2, further comprising:

pre-scaling, by the at least one processor, the received minimum and maximum values to a pre-set first decimal place; and converting, by the at least one processor, the rounded up maximum value to an integer, wherein the rounding up of the received maximum value by the at least one processor comprises rounding up the pre-scaled maximum value, and the determining of the difference value by the at least one processor comprises obtaining a difference value between the pre-scaled minimum value and the rounded up maximum value.

4. The method of claim 1, wherein the converting by the at least one processor comprises processing the mantissa such that the mantissa is unsaturated while converting the difference value to the exponent and the mantissa.

5. The method of claim 1, wherein the converting by the at least one processor comprises subtracting an integer from the mantissa.

6. The method of claim 1, further comprising:

post-scaling, by the at least one processor, the difference value to a pre-set second decimal place.

7. The method of claim 1, further comprising:

determining, by the at least one processor, a difference value between the minimum value and the maximum value by using the mantissa and the exponent.

8. The method of claim 7, further comprising:

determining, by the at least one processor, the maximum value by adding the determined difference value and the minimum value.

9. The method of claim 7, further comprising:

determining, by the at least one processor, the minimum value by subtracting the determined difference value from the maximum value.

10. The method of claim 7, wherein the determining of the difference value by the at least one processor comprises subtracting a certain integer from the mantissa, and obtaining the difference value by shifting an added mantissa by the exponent.

11. A computer program embodied on a non-transitory computer readable medium, the computer program being configured to control at least one processor to perform the method of claim 1.

12. An apparatus, comprising:

at least one processor, the at least one processor comprising:

an input unit configured to receive a minimum value and a maximum value of coordinate values of a bounding box, as floating point values;

an integer converter configured to convert the minimum value and the maximum value to fixed point values;

an encoding difference value obtainer configured to determine a difference value between the received maximum value and the received minimum value;

an exponent converter configured to convert the difference value to an exponent and a mantissa; and an operator configured to round down the minimum value and round up the difference value, wherein the at least one processor is configured to performs a ray-node intersection test using the fixed point value of either the maximum value or the minimum value, and the difference value, and generates an image by performing ray tracing based on a result of the ray-node intersection test, and the encoding difference value obtainer is further configured to determine a difference value between the rounded down minimum value and the maximum value.

13. The apparatus of claim 12, wherein the at least one processor further comprises:

a pre-scaler configured to pre-scale the minimum and maximum values to a pre-set first decimal place; and an integer converter configured to convert the rounded down minimum value to an integer, wherein the operator is further configured to rounds down the pre-scaled minimum value, and the encoding difference value obtainer is further configured to determines a difference value between the pre-scaled maximum value and the rounded down minimum value.

14. The apparatus of claim 12, wherein the at least one processor further comprises:

a post-scaler configured to post-scale the difference value to a pre-set second decimal place.

15. The apparatus of claim 12, wherein the at least one processor further comprises:

a decoding difference value obtainer configured to determine a difference value between the minimum value and the maximum value by using the mantissa and the exponent.

16. The apparatus of claim 12, wherein the at least one processor further comprises:

a maximum value obtainer configured to determine the maximum value by adding the determined difference value and the minimum value.

17. The apparatus of claim 12, wherein the exponent converter is further configured to process the mantissa such that the mantissa is unsaturated while converting the difference value to the exponent and the mantissa.

* * * * *